(12) United States Patent
Lee et al.

(10) Patent No.: US 9,319,602 B2
(45) Date of Patent: Apr. 19, 2016

(54) METHOD AND APPARATUS FOR PROCESSING IMAGE

(71) Applicants: INDUSTRY-ACADEMIC COOPERATION FOUNDATION, YONSEI UNIVERSITY, Seoul (KR); HANWHA TECHWIN CO., LTD., Changwon-Si (KR)

(72) Inventors: Jeong-Ahn Lee, Changwon (KR); Min-seok Lee, Seoul (KR); Ji-yong Kwon, Seoul (KR); Moon-gi Kang, Seoul (KR)

(73) Assignees: INDUSTRY-ACADEMIC COOPERATION FOUNDATION, YONSEI UNIVERSITY, Seoul (KR); Hanwha Techwin Co., Ltd., Changwon-si (KR)

( * ) Notice: Subject to any disclaimer, the term of this patent is extended or adjusted under 35 U.S.C. 154(b) by 358 days.

(21) Appl. No.: 13/919,154

(22) Filed: Jun. 17, 2013

(65) Prior Publication Data

US 2014/0152838 A1 Jun. 5, 2014

(30) Foreign Application Priority Data

Dec. 5, 2012 (KR) .................. 10-2012-0140543

(51) Int. Cl.
*H04N 5/33* (2006.01)
*H04N 9/04* (2006.01)

(52) U.S. Cl.
CPC ............... *H04N 5/332* (2013.01); *H04N 9/045* (2013.01)

(58) Field of Classification Search
CPC ........................................ H04N 9/045
USPC ....................................... 348/164
See application file for complete search history.

(56) References Cited

U.S. PATENT DOCUMENTS

| 6,424,749 B1 * | 7/2002 | Zhu et al. ............ 382/260 |
| 7,251,345 B1 | 7/2007 | Han |
| 2008/0175439 A1 * | 7/2008 | Kurata ............... 382/107 |
| 2012/0082396 A1 * | 4/2012 | Crandall et al. ........ 382/266 |

FOREIGN PATENT DOCUMENTS

| JP | 4311988 B2 | 8/2009 |
| JP | 2012-60602 A | 3/2012 |

OTHER PUBLICATIONS

Lu et al., Designing Color Filter Arrays for the Joint Capture of Visible and Near-Infrared Images, EPFL, Switzerland, 2009.*
Bannore, Iterative-Interpolation Super-Resolution Img. Recons., SCI 195, 2009.*

* cited by examiner

*Primary Examiner* — Jamie Atala
*Assistant Examiner* — James Boylan
(74) *Attorney, Agent, or Firm* — Sughrue Mion, PLLC

(57) ABSTRACT

A method of processing an image includes: offsetting aliasing by analyzing frequency characteristics of at least one color channel and a NIR channel, of a MSFA pattern image; generating a high resolution base image; and offsetting an artifact from the high resolution base image by weighting the high resolution base image and a blur image, based on a pixel difference value between the blur image and the high resolution base image.

17 Claims, 11 Drawing Sheets

MFA Input
(R, G, B, NIR)

FIG. 4
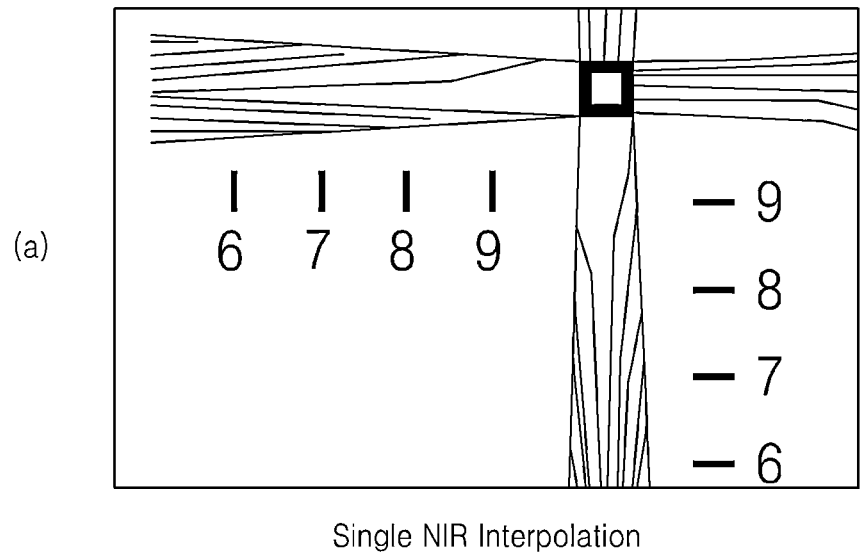
(a) Single NIR Interpolation
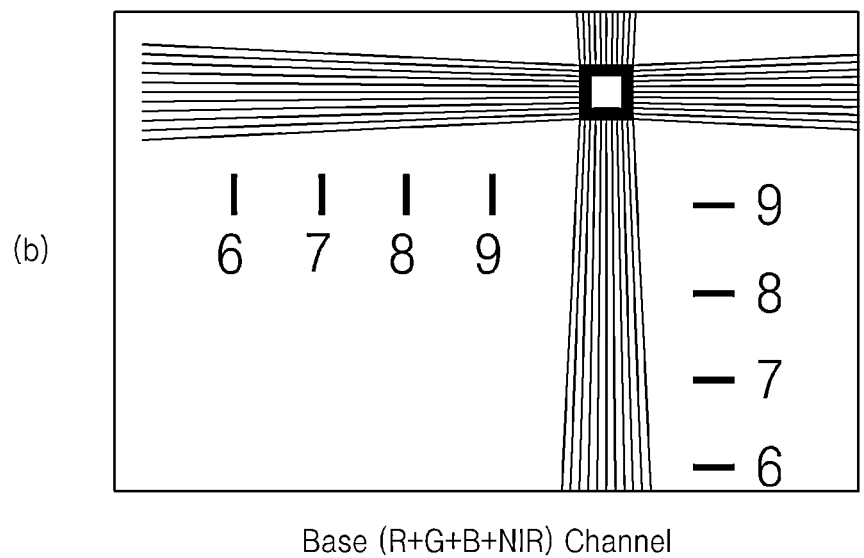
(b) Base (R+G+B+NIR) Channel 910    920

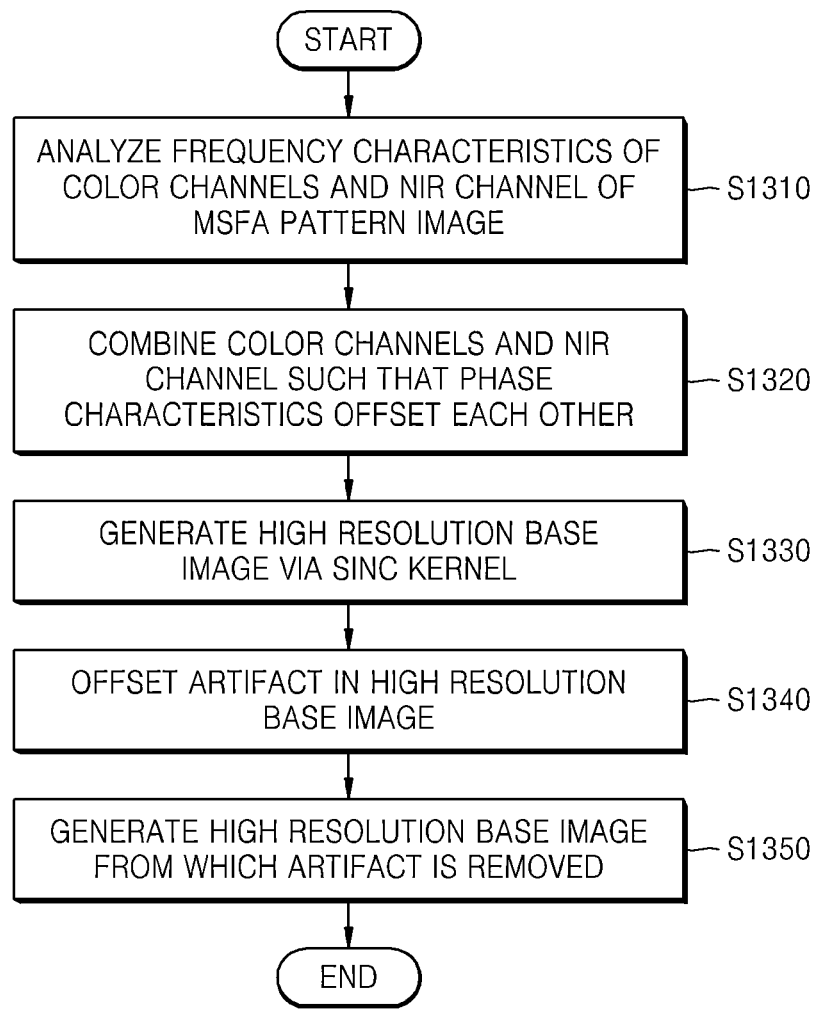

METHOD AND APPARATUS FOR PROCESSING IMAGE

CROSS-REFERENCE TO RELATED PATENT APPLICATION

This application claims priority from Korean Patent Application No. 10-2012-0140543, filed on Dec. 5, 2012, in the Korean Intellectual Property Office, the disclosure of which is incorporated herein in its entirety by reference.

BACKGROUND

1. Field

Exemplary embodiments relate to a multi-spectral filter array (MSFA) pattern image process. More particularly, exemplary embodiments relate to a method of processing an image, wherein a high resolution image is generated by improving a resolution and removing artifacts of an MSFA pattern image.

2. Description of the Related Art

A multi-spectral filter array (MSFA) of the related art is used to simultaneously obtain an image in a visible band, and a near-infrared (NIR) image in an invisible band. In other words, the MSFA of the related art is used to simultaneously obtain channel images.

However, a pattern image obtained by using the MSFA of the related art has a low resolution, since an image is obtained as each color channel and an NIR channel are sub-sampled.

SUMMARY

According to an embodiment, resolutions of an image in a visible band and a near-infrared (NIR) image in an invisible band are prevented from being degraded, when the image in the visible band and the NIR image in the invisible band are simultaneously obtained.

According to another embodiment, a method and apparatus is provided for processing an input image with a low resolution multi-spectral filter array (MSFA) pattern to reconstruct a high resolution base image.

Further, in exemplary embodiments, a high resolution base image is reconstructed using a low resolution MSFA pattern image obtained from at least one color channel and an NIR channel, which are derived from a multi-spectral filter. Therefore, a high resolution image having low artifacts, while including a lot of high frequency information is generated.

According to an aspect of the exemplary embodiments, there is provided a method of processing an image, the method including: offsetting aliasing by analyzing frequency characteristics of at least one color channel and a near-infrared (NIR) channel, of a multi-spectral filter array (MSFA) pattern image; generating a high resolution base image by amplifying resolutions of the at least one color channel and the NIR channel from which the aliasing is removed, up to a resolution of a base image; and offsetting an artifact from the high resolution base image by weighting and combining the high resolution base image and a blur image obtained by blurring the high resolution base image, based on a pixel difference value between the blur image and the high resolution base image.

The offsetting of the aliasing may include combining the at least one color channel and the NIR channel of the MSFA pattern image while considering different phase characteristics shown in the at least one color channel and the NIR channel.

The generating of the high resolution base image may include amplifying the resolutions of the at least one color channel and the NIR channel from which the aliasing is removed, up to the resolution of the base image using a sinc function.

The cutoff frequency $w_c$ of the sinc function may be adaptively set according to statistical characteristics of a location region obtained from the MSFA pattern image, and when a local variance is high, the cutoff frequency $w_c$ may be set to increase a pass-band of the sinc function, and when the local variance is low, the cutoff frequency $w_c$ may be set to decrease the pass-band of the sinc function.

The cutoff frequency $w_c$ of the sinc function may be set based on a tan h function using a local variance of the MSFA pattern image as a variable.

The offsetting of the artifact may include offsetting the artifact by weighting and combining the blur image and the high resolution base image, wherein, when many artifacts are observed, weighting the blur image more, when few artifacts are observed, weighting the high resolution base image more, and a sum of weights of the blur image and the high resolution base image may be 1.

According to another aspect of the exemplary embodiments, there is provided a method of processing an image, the method including: offsetting aliasing by analyzing frequency characteristics of at least one color channel and a near-infrared (NIR) channel, of a multi-spectral filter array (MSFA) pattern image and combining the at least one color channel and the NIR channel such that phase characteristics of the at least one color channel and the NIR channel offset each other; generating a high resolution base image by amplifying resolutions of the at least one color channel and the NIR channel from which the aliasing is removed, up to a resolution of a base image using a sinc function, wherein a cutoff frequency $w_c$ of the sinc function is adaptively set according to statistical characteristics of a local region obtained from the MSFA pattern image; and offsetting an artifact of the high resolution base image by weighting and combining the high resolution base image and a blur image obtained by blurring the high resolution base image, based on a pixel difference value between the blur image and the high resolution base image.

According to another aspect of the exemplary embodiments, there is provided an apparatus for processing an image, the apparatus including: an aliasing offset device configured to aliasing by analyzing frequency characteristics of at least one color channel and a near-infrared (NIR) channel of a multi-spectral filter array (MSFA) pattern image; a high resolution base image generator configured to generate a high resolution base image by amplifying resolutions of the at least one color channel and the NIR channel from which the aliasing is removed, up to a resolution of a base image; and an artifact offset device configured to offset an artifact from the high resolution base image by weighting and combining the high resolution base image and a blur image obtained by blurring the high resolution base image, based on a pixel difference value between the blur image and the high resolution base image.

According to another aspect of the exemplary embodiments, there is provided an apparatus for processing an image, the apparatus including: an aliasing offset device configured to offset aliasing by analyzing frequency characteristics of at least one color channel and a near-infrared (NIR) channel, of a multi-spectral filter array (MSFA) pattern image and combining the at least one color channel and the NIR channel such that phase characteristics of the at least one color channel and the NIR channel offset each other; a high resolution base image generator configured to generate a high resolution base image by amplifying resolutions of the at least one color channel and the NIR channel, from which the aliasing is removed, up to a resolution of a base image using a sinc function, wherein a cutoff frequency $w_c$ of the sinc function is adaptively set according to statistical characteristics of a local region obtained from the MSFA pattern image; and an artifact offset device configured to offset an artifact of the high resolution base image by weighting and combining the high resolution base image and a blur image obtained by blurring the high resolution base image, based on a pixel difference value between the blur image and the high resolution base image.

BRIEF DESCRIPTION OF THE DRAWINGS

The above and other features and advantages of the exemplary embodiments will become more apparent by describing in detail exemplary embodiments thereof with reference to the attached drawings, in which:

FIGS. 4A and 4B respectively illustrate a case where a base image is generated by using a single channel of an MSFA pattern image and a case where a base image is generated by using four channels of an MSFA pattern image;

FIG. 13 is a flowchart illustrating a method of processing an image, wherein a high resolution base image is generated from an MSFA pattern image, according to an embodiment.

DETAILED DESCRIPTION OF THE EXEMPLARY EMBODIMENTS

Hereinafter, the exemplary embodiments will be described more fully with reference to the accompanying drawings, in which exemplary embodiments are shown.

The terminology used herein is for the purpose of describing particular embodiments only and is not intended to be limiting of the exemplary embodiments. As used herein, the singular forms are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless defined otherwise, all terms, including technical and scientific terms used herein, have the same meaning as is commonly understood by one of ordinary skill in the art to which the exemplary embodiments belong. Also, terms defined in dictionaries that are commonly used shall not be interpreted ideally or excessively unless clearly defined otherwise.

Figure 1:
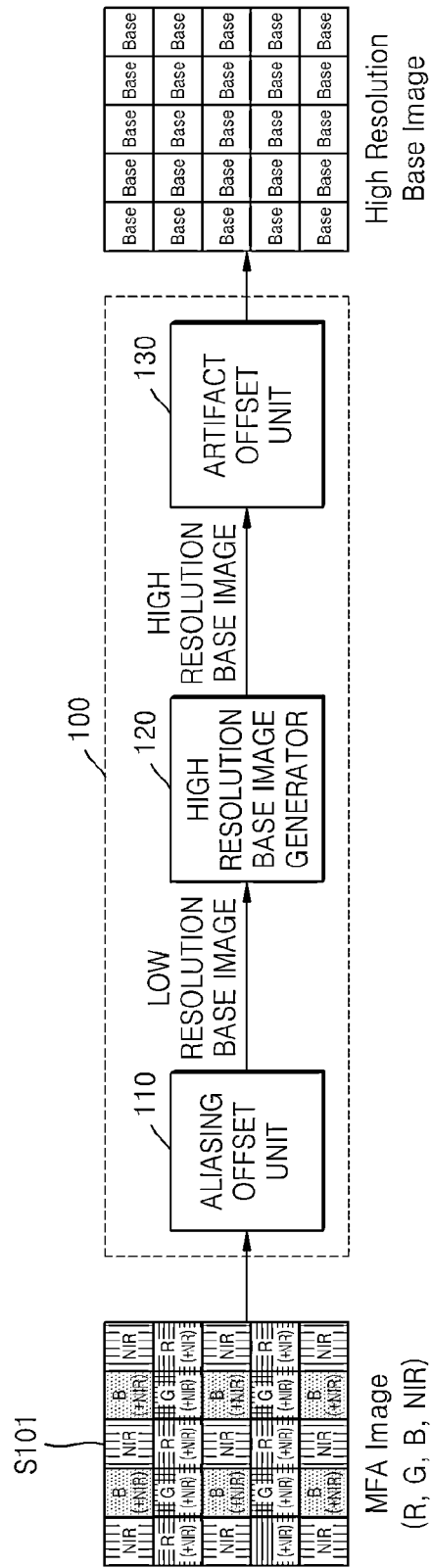
FIG. 1 is an inner structural diagram of an apparatus for processing an image, according to an embodiment.

FIG. 1 is a block diagram of an apparatus 100 for processing an image, according to an embodiment.

An example of the apparatus 100 of FIG. 1 includes a camera system that may be an image capturing system, such as a digital camera, a camcorder, or a surveillance camera, and may be installed on a computer, a personal digital assistant (PDA), a portable multimedia player (PMP), or a mobile phone.

The apparatus 100 receives a multi-spectral filter array (MSFA) pattern image S101 as an input image. The MSFA pattern image is output from an image sensor including an MSFA with a color filter and a near-infrared (NIR) filter.

According to an embodiment, upon receiving the MSFA pattern image S101 having a low resolution as the input image, the apparatus 100 generates a high resolution base image having low artifacts, while including a lot of high frequency information.

Accordingly, the apparatus 100 includes an aliasing offset unit 110, a high resolution base image generator 120, and an artifact offset unit 130.

The aliasing offset unit 110 analyzes frequency characteristics of R, G, and B color channels and an NIR channel of the MSFA pattern image S101. The MSFA pattern image S101 has aliasing since each of the R, G, and B color channels and the NIR channel are sub-sampled to ¼.

Therefore, under an assumption that high frequency components of the R, G, and B color channels and the NIR channel are similar, the aliasing offset unit 110 analyzes the frequency characteristics of the R, G, and B color channels and the NIR channel, and offsets an aliasing by combining the R, G, and B color channels and the NIR channel, while considering phase characteristics differently and repeatedly shown, according to channels.

Characteristics of an MSFA pattern image, that is an input image of the aliasing offset unit 110, are described below with reference to FIGS. 2 and 3, and aliasing generated in an MSFA pattern image and phase characteristics used to offset the aliasing are described below with reference to FIGS. 4A through 8.

The high resolution base image generator 120 generates a high resolution base image by amplifying resolutions of the R, G, and B color channels and the NIR channel, from which the aliasing is removed by the aliasing offset unit 110, up to a resolution of a base image, using a sinc function.

The high resolution base image generator 120 also generates the high resolution base image by adaptively setting a cutoff frequency $w_c$ of the sinc function according to statistical characteristics of a local region of the MSFA pattern image S101. Further, the high resolution base image generator 120 restores a lot of information of a high frequency domain by increasing the cutoff frequency ($w_c^{high}$) in a detailed region of the MSFA pattern image S101, and passes through less artifact information of the high frequency domain by decreasing the cutoff frequency ($w_c^{low}$) in a flat region of the MSFA pattern image S101, as will be described in detail below with reference to FIGS. 9 through 14.

While generating the high resolution base image via the aliasing offset unit 110 and the high resolution base image generator 120, an artifact may be left in a high frequency band if the cutoff frequency $w_c$ of the sinc function is increased to improve the resolution of the base image. Also, due to non-uniform noise of the image sensor including the MSFA, a part of the artifact may not be removed while the high resolution base image generator 120 generates the base image.

The artifact offset unit 130 weights the high resolution base image generated by the high resolution base image generator 120 and a blur image obtained by blurring the high resolution base image, based on a pixel difference value of the blur image and the high resolution base image, so as to offset an artifact of the high resolution base image.

Figure 2:
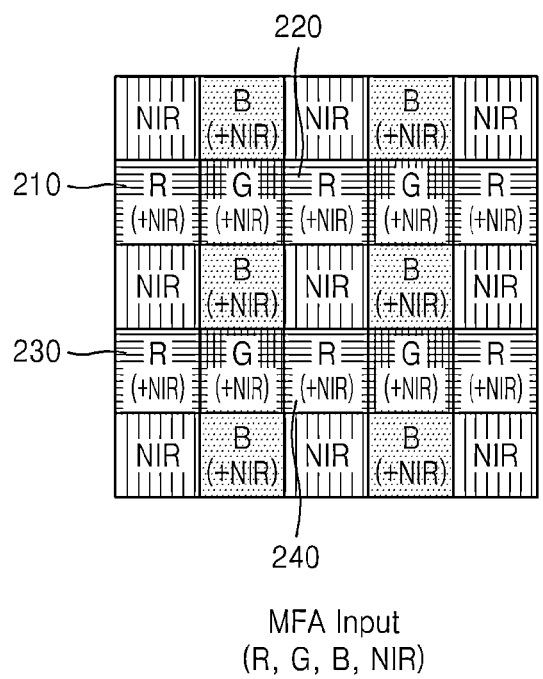
FIG. 2 is a diagram of a multi-spectral filter array (MSFA) pattern image that is an input image of an apparatus for processing an image, according to an embodiment.
Figure 3:
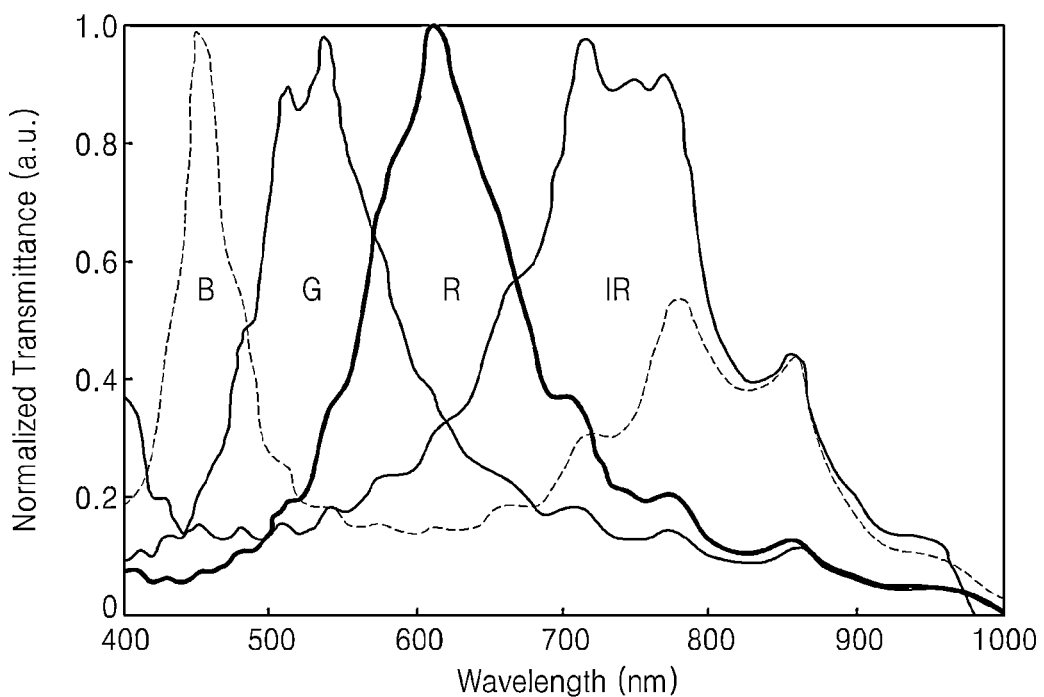
FIG. 3 illustrates a spectrum of an MSFA pattern image according to channels, wherein the MSFA pattern image is an input image of an apparatus for processing an image, according to an embodiment.

FIGS. 2 and 3 respectively illustrate a shape and spectrum of an MSFA pattern image.

As shown in FIG. 2, each channel of the MSFA pattern image is sub-sampled by ¼ channels 210, 220, 230, and 240. Each channel of the MSFA pattern image has characteristics of a low resolution channel, having 0.5 width and 0.5 length of a target resolution. When a base image is rearranged to a high resolution base image using a single channel of the MSFA pattern image, minute edge components are not divided, and aliasing is severe (as shown in FIG. 4A).

Referring to FIG. 3, information overlaps between spectra of R, G, and B color channels, and an NIR channel forming the MSFA pattern image.

Accordingly, as shown in FIG. 4B, one base image needs to be obtained using all of low resolution R, G, and B color channels and a low resolution NIR channel, so as to reduce aliasing.

FIGS. 4A and 4B illustrate a case where a base image is generated using a single channel of an MSFA pattern image, and a case where a base image is generated using four channels of an MSFA pattern image.

In FIG. 4A, a single NIR channel is used to form a high resolution base image via an interpolation process. In this scenario, a minute edge component is not divided, and aliasing is severe.

In FIG. 4B, a high resolution base image is generated using all color channels and an NIR channel of an MSFA pattern image, according to an embodiment. In this scenario, aliasing is reduced, and a minute edge component is divided as well.

Figure 5:
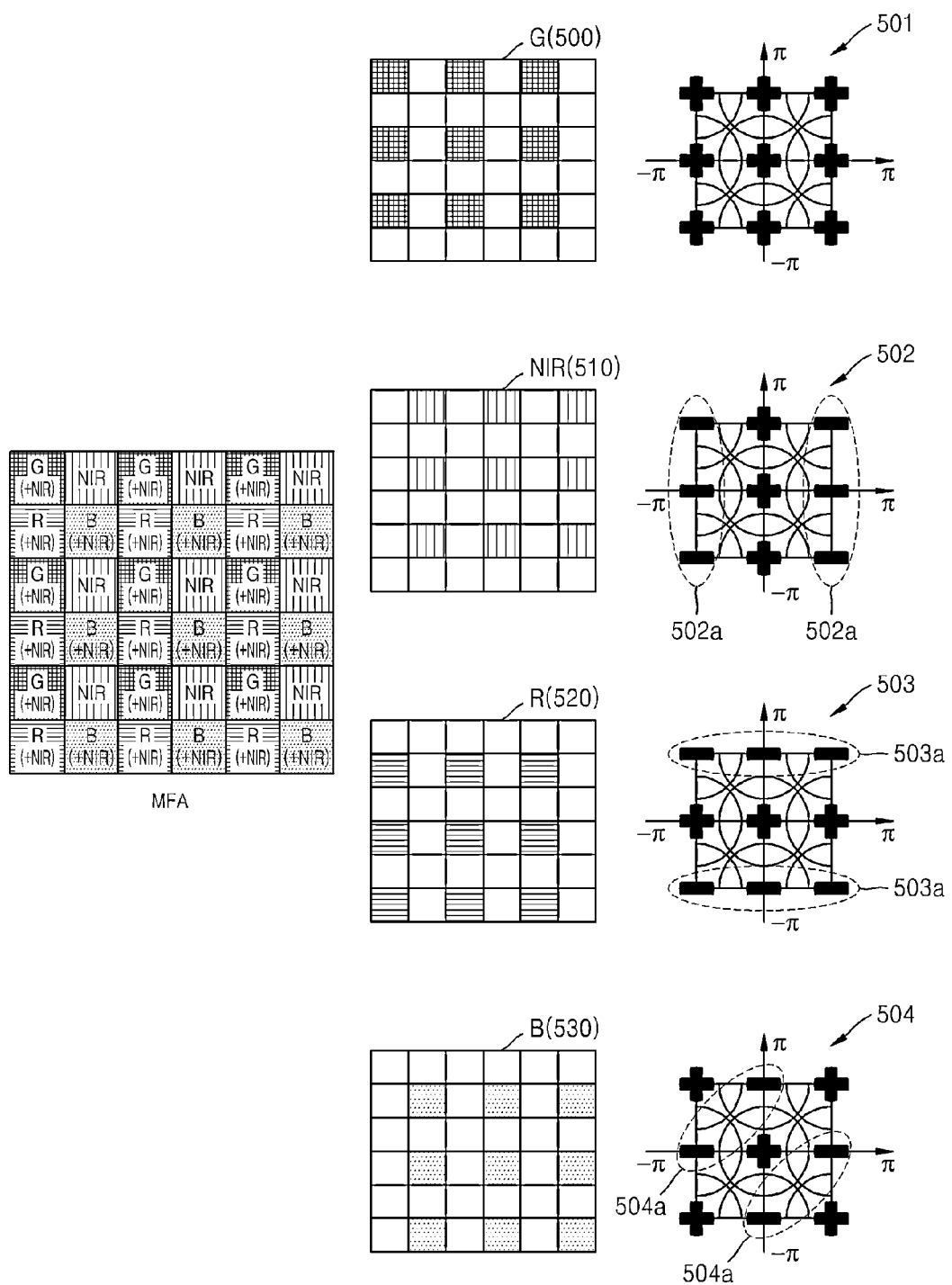
FIG. 5 illustrates frequency characteristics of each channel of an MSFA pattern image, according to an embodiment.

FIG. 5 illustrates frequency characteristics of each channel of an MSFA pattern image, according to an embodiment.

Looking at a sub-sampled G color channel 500 in a 2-dimensional (2D) Fourier domain 501, an original signal is repeatedly shown in eight pies ((−Π,−Π), (−Π,0), (−Π,Π), (0,−Π), (0,Π), (Π,−Π) (Π,0), (Π,Π)), in positive signs, similar to a source signal.

A sub-sampled NIR channel 510 is located one pixel right to the sub-sampled G color channel 500. Thus, a 2D Fourier domain 502 of the sub-sampled NIR channel 510 has an opposite phase to the 2D Fourier domain 501 of the sub-sampled G color channel 500, in a vertical direction 502a.

Similarly, a sub-sampled R channel 520 is located one pixel below the sub-sampled G color channel 500 in the MSFA pattern image. Thus, a 2D Fourier domain 503 of the sub-sampled R channel 520 has an opposite phase to the 2D Fourier domain 501 of the sub-sampled G color channel 500, in a horizontal direction 503a.

A sub-sampled B channel 530 is located one pixel below the sub-sampled G color channel 500 in a right diagonal direction in the MSFA pattern image. Thus, a 2D Fourier domain 504 of the sub-sampled B channel 530 has an opposite phase to the 2D Fourier domain 501 of the sub-sampled G color channel 500 in a diagonal direction 504a.

Figure 6:
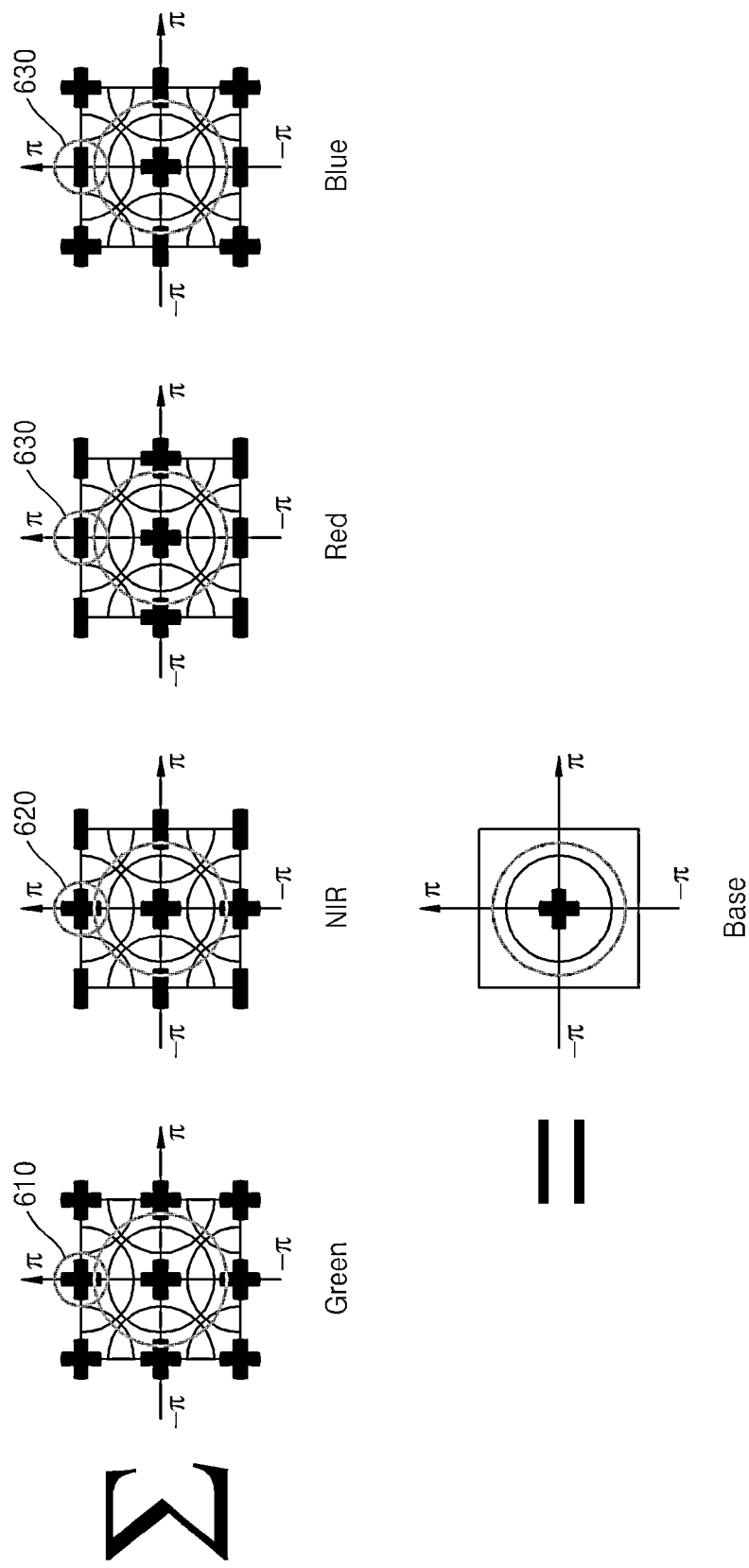
FIG. 6 is a diagram for describing removing of aliasing while considering frequency characteristics of each channel of an MSFA pattern image, according to an embodiment.

FIG. 6 is a diagram for describing removing of aliasing while considering frequency characteristics of each channel of an MSFA pattern image, according to an embodiment.

FIG. 6 is a diagram for describing an operation of the aliasing offset unit 110 of FIG. 1. An aliasing component in a low frequency domain may be reduced by combining all of R, G, and B color channels and an NIR channel, using phase characteristics repeatedly differently shown, according to frequency characteristics of each channel of an MSFA pattern image (as shown in FIG. 5).

For example, at (0,Π), signs of signals in a G color channel 610 and an NIR channel 620 are (+), but signs of signals in an R color channel 630 and a B color channel 640 are (−) due to a phase change. Thus, aliasing of a high frequency component in a low frequency domain is offset, when the signals are combined.

A final base image is obtained when aliasing components located outside (0,0) are removed, using a low frequency pass filter.

Figure 7:
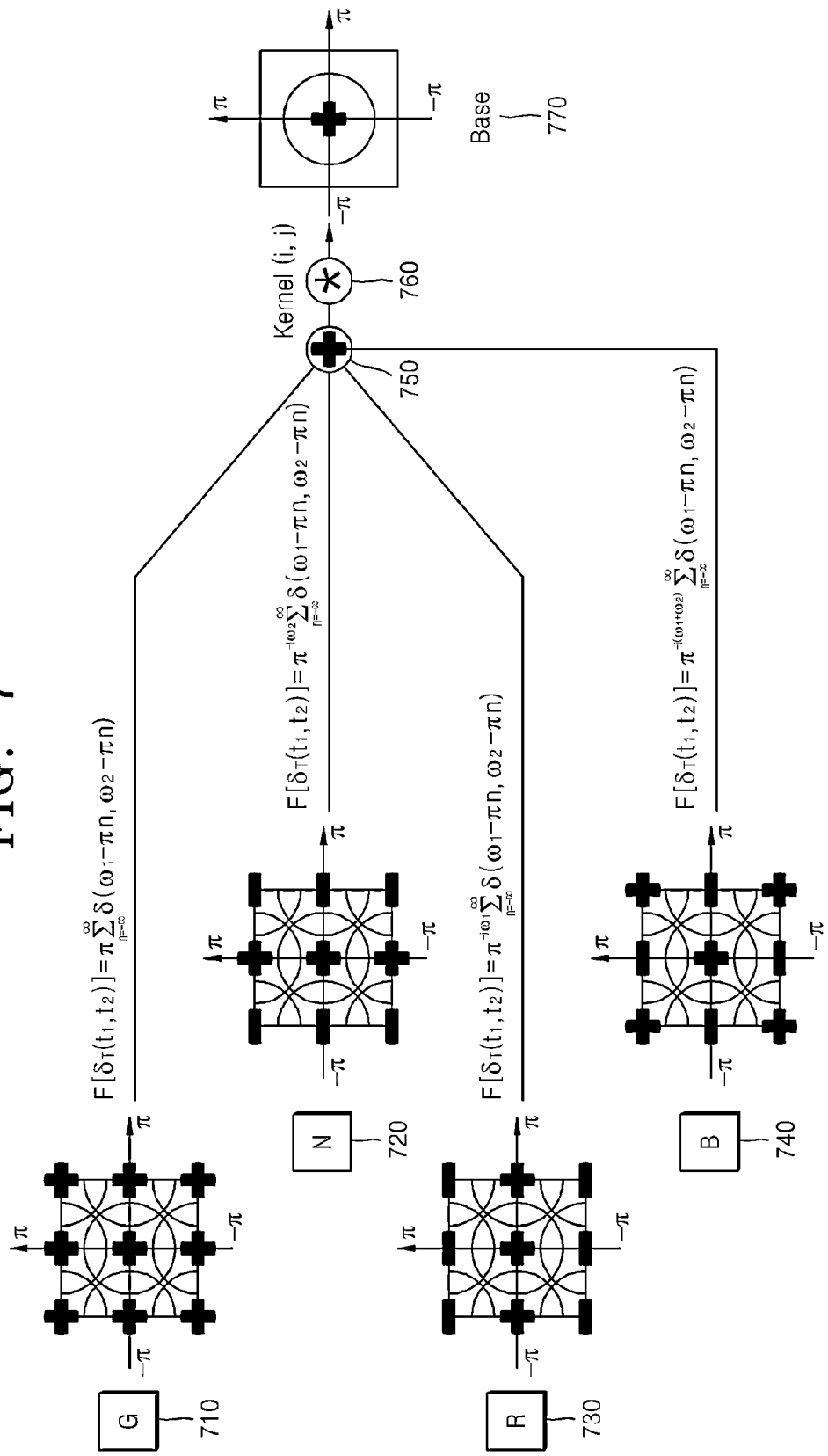
FIG. 7 is a conceptual diagram of generating a high resolution base image, according to an embodiment.

FIG. 7 is a conceptual diagram of generating a high resolution base image 770, according to an embodiment.

A G color channel 710, an NIR channel 720, an R color channel 730, and a B color channel 740 of an MSFA pattern image are combined (summation) in operation 750, after considering frequency characteristics such that aliasing is offset, and then pass through a kernel 760. Thus, the high resolution base image 770 is generated, wherein resolutions of the G, R, and B color channels 710, 730, and 740 and the NIR channel 720, from which the aliasing is removed, are amplified by a resolution of a base image.

The scenario above represented by Equation 1 below:

$$\text{Base}(i,j)=(G_s(i,j)+N_s(i,j)+R_s(i,j)+B_s(i,j))*\text{Kernel}(i,j) \quad \text{[Equation 1]}$$

In Equation 1, Base(i,j) denotes a high resolution base image and Gs, Ns, Rs, and Bs each denote a sub-sampled channel forming an MSFA pattern image. In Equation 1, a kernel amplifies a resolution of each sampled channel image by a resolution of a base image.

Figure 8:
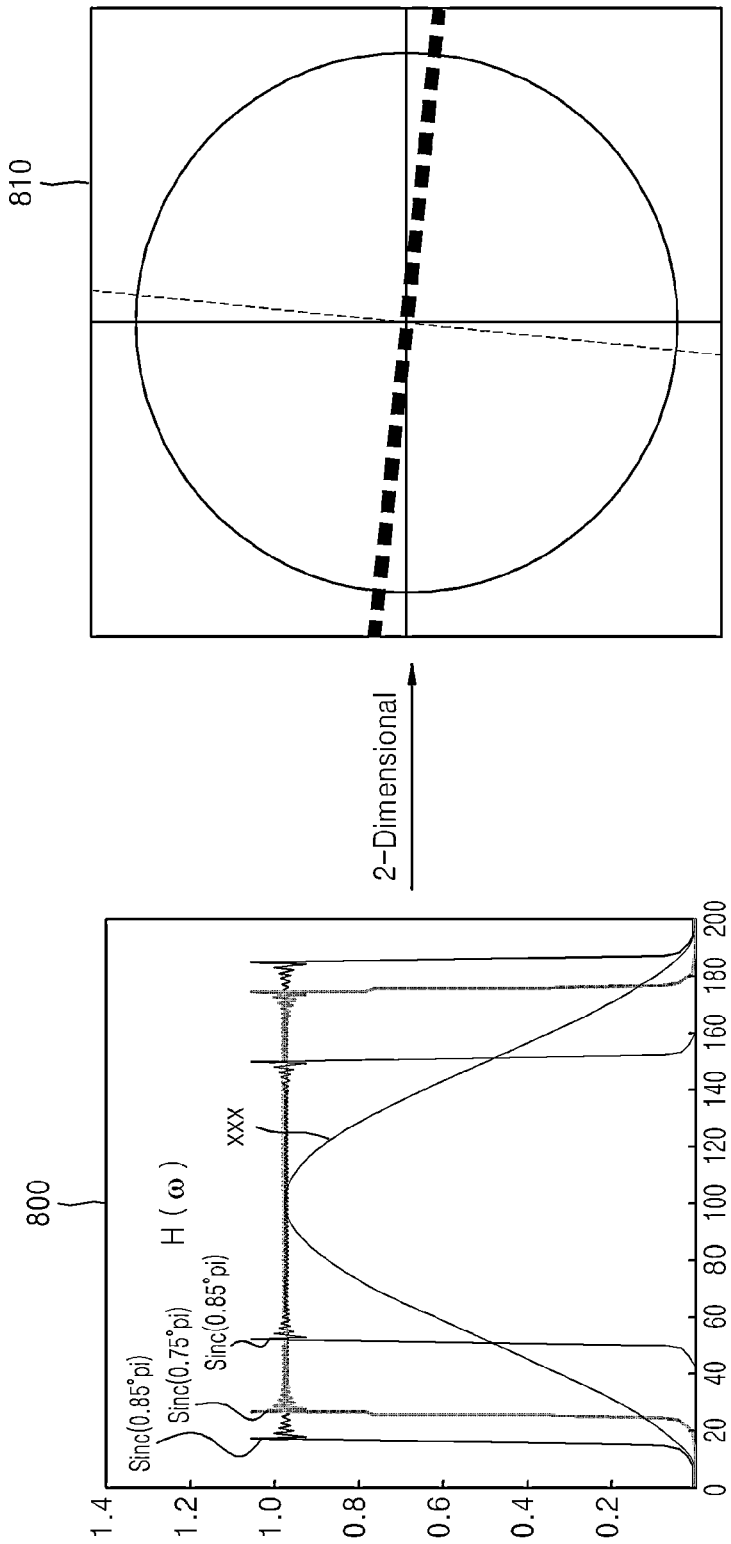
FIG. 8 illustrates a response on a frequency axis of a sinc function according to a pass-band.

As shown in FIG. 8, the kernel may be constructed by a sinc function. FIG. 8 illustrates a response on a frequency axis of a sinc function, according to a pass-band. As a cutoff frequency increases, information in a higher frequency band is passed through. When a high frequency band is passed through, information of a high frequency band may be restored. Thus, a resolution of a base image may be improved, as shown in a graph 800. A sinc function is 2-dimensionally applied in an actual MSFA image, as denoted by a reference numeral 810 of FIG. 8.

Equation 2 below is obtained when an ideal sinc function is inverse Fourier transformed:

$$H(\omega) = \begin{cases} 1, & \omega \le \omega_c \\ 0, & \omega \ge \omega_c \end{cases} - h[n] = \frac{\sin(\omega_c n)}{\omega_c n} \frac{\omega_c}{\pi} \quad \text{[Equation 2]}$$

In Equation 2, H(w) denotes characteristics of a frequency domain of a sinc function, and h(n) denotes characteristics of a spatial domain. Also, $w_c$ denotes a cutoff frequency.

Alternatively, the kernel may be realized by a Lanczos-windowed sinc function. Equation 3 below shows a Lanczos-windowed sinc kernel:

$$h[n] = \frac{\sin(\omega_c n)}{\omega_c n} \frac{\sin(\omega_c n/a)}{\omega_c n/a}; |n| < a \quad \text{[Equation 3]}$$

In Equation 3, a denotes a factor adjusting a cutoff frequency of the Lanczos-windowed sinc kernel.

$$\text{Base}(i,j) = (G_s(i,j)*\text{Sinc}(i,j) + N_s(i,j)*\text{Sinc}(i,j) + R_s(i,j)*\text{Sinc}(i,j) + B_s(i,j)*\text{Sinc}(i,j))$$ [Equation 4]

Equation 4 above is an example of realizing the kernel of Equation 1 in a sinc function, and represents a process of generating a high resolution base image by applying a sinc kernel to each sub-sampled channel of an MSFA pattern image.

Figure 9:
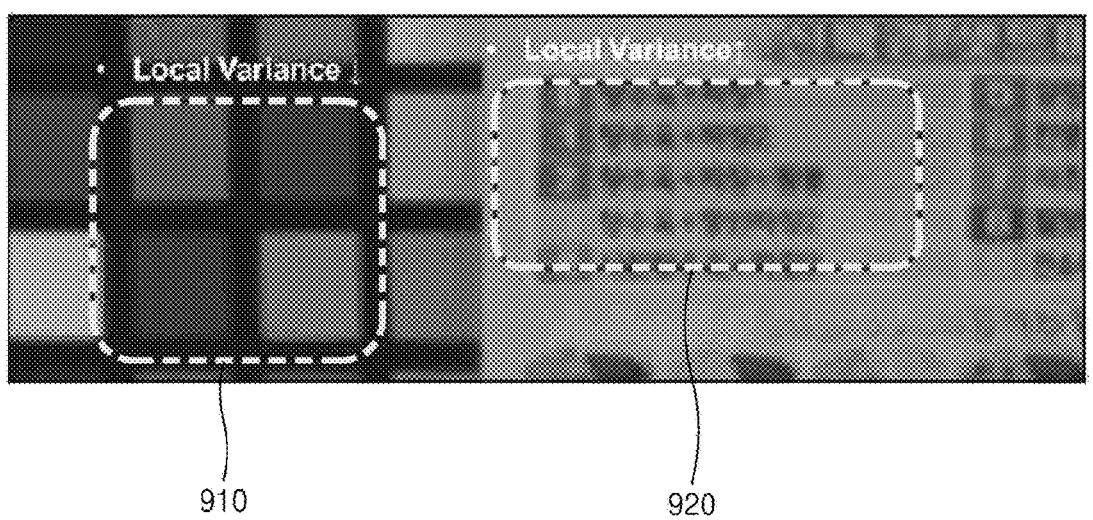
FIG. 9 illustrates statistical characteristics of an input image according to local regions, according to an embodiment.

FIG. 9 illustrates statistical characteristics of an input image according to local regions, according to an embodiment.

According to an embodiment, the statistical characteristics of the local regions of the input image are reflected, while designing a kernel. A local variance is used as an example of the statistical characteristics of the local regions.

A local variance is relatively low in a flat region 910, and a local variance is relatively high in a detailed region 920.

Figure 10:
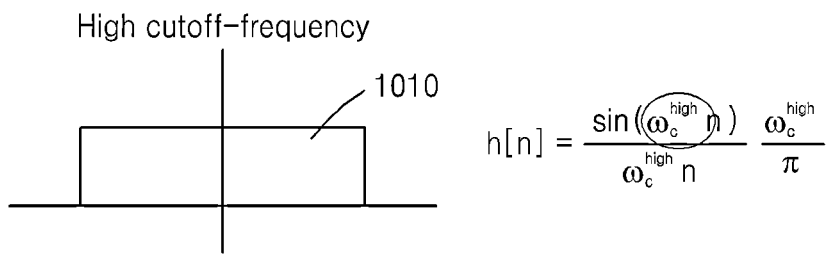
FIGS. 10 and 11 are diagrams for describing designing of a kernel by reflecting statistical characteristics of an input image according to local regions, according to an embodiment.
Figure 11:
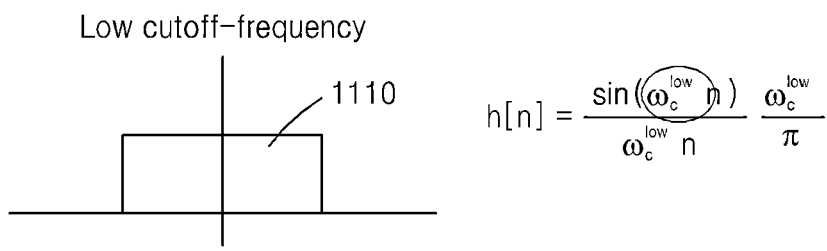

FIGS. 10 and 11 are diagrams for describing designing of a kernel by reflecting statistical characteristics of an input image according to local regions, according to an embodiment.

According to an embodiment, a pass-band of a kernel is decreased to pass through low artifacts when a local variance is low (refer to FIG. 11), and a pass-band of a kernel is increased to restore a lot of high frequency information when a local variance is high (refer to FIG. 10), so as to obtain a high resolution base image.

In FIG. 10, a cutoff frequency $w_c$ of a sinc function is set high, and a pass-band 1010 at a frequency axis is wide. Since the pass-band 1010 is wide, a base image generates and passes a lot of high frequency information of an image.

As a result, a resolution is improved in a detailed region, where a local variance is relatively high. Further, more artifacts, such as ringing and shooting of a high frequency band, are generated in a flat region, where a local variance is relatively low.

In FIG. 11, a cutoff frequency $w_c$ of a sinc function is set low, and a pass-band 1110 at a frequency axis is narrow. Since the pass-band 1110 is narrow, low artifacts of an image pass through.

As a result, a resolution is low in a detailed region, where a local variance is relatively high. Further, low artifacts are generated in a flat region, where a local variance is relatively low.

According to an embodiment, a cutoff frequency $w_c$ of a sinc function, used while designing a kernel, is adaptively set according to statistical characteristics of a local region obtained from an MSFA pattern image. The cutoff frequency $w_c$ is set to increase a pass-band of the sinc function, when a local variance is high, and is set to decrease the pass-band of the sinc function, when the local variance is low.

According to an embodiment, a cutoff frequency may be set to have a high value equal to or above 0.5Π, so as to generate a high resolution base image.

Equation 5 below is used to adaptively generate a high resolution base image according to a local variance. A resolution is improved by restoring high frequency information as much as possible in a detailed region, and an artifact is reduced in a flat region according to local regions of an input image. Thus, the high resolution base image having high quality is generated.

$$\text{Base}(i,j) = (G_s(i,j) + N_s(i,j) + R_s(i,j) + B_s(i,j))*\text{Kernel}(w_c^{adap})$$ [Equation 5]

A cutoff frequency $w_c^{adap}$ adaptively set according to statistical characteristics of local regions used in a sinc function may be obtained, according to Equation 6 below:

$$\omega_c^{adap} = \frac{\omega_c^{high} - \omega_c^{low}}{\max(\sigma_{local}^2) - \min(\sigma_{local}^2)} \times (x)\omega_c^{low}$$ [Equation 6]

In Equation 6, $\sigma_{local}^2$ denotes a local variance of a local region in an MSFA pattern image, and x is an input for obtaining an adaptive cutoff frequency and denotes variance of a local image adjusted according to an s-curve (tan h) weight.

x may be represented according to Equation 7 below:

$$x = \frac{\max(\sigma_{local}^2)}{2} \times \tanh\left(\frac{p}{\max(\sigma_{local}^2)}\sigma_{local}^2 - k\right)$$ [Equation 7]

In Equation 6, p and k are factors for adjusting a local variance, wherein p is applied to a high weight region in an s-curve and k is applied to a low weight region in the s-curve.

A local variance is obtained in each sub-channel of an MSFA pattern image. According to an embodiment, a cutoff frequency of a sinc function is adaptively set according to Equation 6, while amplifying resolutions of color channels and an NIR channel of an MSFA pattern image, from which aliasing is removed by a resolution of a base image using the sinc function.

In this scenario, an increasing function may be linear, s-curve, or exponential. In Equation 6, an s-curve tan h (hyperbolic tangent) function is used, and a cutoff frequency has characteristics described below with reference to FIG. 12.

Figure 12:
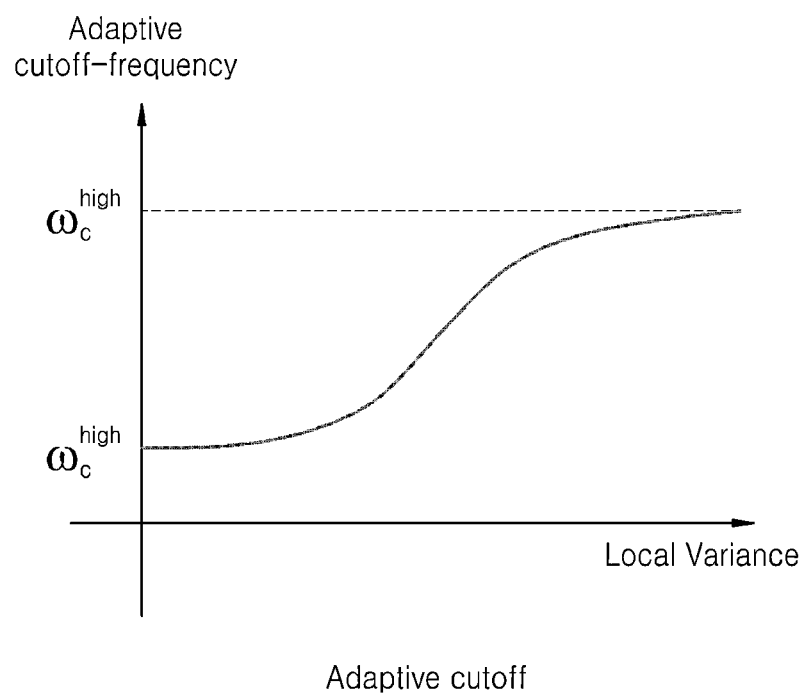
FIG. 12 illustrates a case where a tan h (hyperbolic tangent) function is used to set a cutoff frequency according to local variances.

FIG. 12 illustrates a case where a tan h (hyperbolic tangent) function is used to set a cutoff frequency according to local variances.

As shown in FIG. 12, a cutoff frequency increases in an s-curve, when a local variance increases between a high cutoff frequency $w_c^{high}$ and a low cutoff frequency $w_c^{low}$, which are pre-determined.

An artifact is generated due to two reasons while a high resolution base image is generated, after aliasing is removed. An artifact in a high frequency band may be left while a sinc kernel having a high cutoff frequency as a pass-band passes through an input image in order to improve a resolution of a base image, as described above. Also, some noise may not be removed while generating a base image since the noise of an image sensor, including an MSFA, is not uniform.

Accordingly, an artifact is offset by determining the artifact in a high resolution base image generated, as described above, with reference to FIGS. 7 through 12.

$$\text{Base}(i,j) = R_s^{ker}(i,j) + G_s^{ker}(i,j) + B_s^{ker}(i,j) + N_s^{ker}(i,j)$$ [Equation 8]

In FIG. 8, a high resolution base image is generated by reducing an aliasing in sub-sampled channels of an MSFA pattern image, and then combining the sub-sampled channels that passed through a sinc kernel. In order to prevent an artifact from being generated in the high resolution base image according to Equation 8 above, the high resolution base image is combined to a blur image without an artifact, according to Equation 9 below:

$$f(R_s^{ker}) = (1-\alpha_R)R_s^{ker}(i,j) + \alpha_R\text{Blur}(R_s^{ker}(i,j))$$ [Equation 9]

In Equation 9, a blur image, without an artifact and a high resolution image having an artifact, are combined so as to offset the artifact in an R color channel. In Equation 9, a weight α is a parameter for determining whether an artifact exists in a base image, wherein a difference value between a current pixel and an average value within a 5×5 region having an intensity value of the base image as a weight is determined to be a minimum value, if the difference value is less than a threshold. The weight α obtained is used as a weight for offsetting an artifact.

The weight α is obtained according to Equation 10 below:

$$\alpha_R = \frac{\min(|R_s^{ker}(i, j) - Blur(R_s^{ker}(i, j))|, th)}{th}$$ [Equation 10]

A difference between the blur image without an artifact, and the high resolution image with an artifact, is obtained, and the weight α is limited to a range from 0 to 1 using a th value. Here, when the weight α is high, it is determined that there are many artifacts, and the blur image is used. When the weight α is low, the high resolution image is used.

$$Blur(R_s^{ker}(i, j)) = \sum_{(p,q) \in Nof(i,j)} R_s^{ker}(i, j) * w_R(p, q) / w_{sum}$$ [Equation 11]

In Equations 10 and 11 above, a blur image is determined, based on a weighted sum with an adjacent pixel in an image with an artifact. A weight is determined according to a difference between a current pixel and an adjacent pixel in a base image. When the difference is increased, the current pixel is determined to be different from the adjacent pixel, and the weight is decreased. When the difference is decreased, the current pixel is determined to be similar to the adjacent pixel, and the weight is increased.

The above processes are performed on R, G, and B color channels and an NIR channel, and then the R, G, and B color channels and the NIR channel, wherein artifacts are offset, are combined to obtain a final base image according to Equation 12 below:

$$Base(i,j) = f(R_s^{ker})(i,j)) + f(G_s^{ker}(i,j)) + f(B_s^{ker}(i,j)) + f(N_s^{ker}(i,j))$$ [Equation 12]

FIG. 13 is a flowchart illustrating a method of processing an image, wherein a high resolution base image is generated from an MSFA pattern image, according to an embodiment.

In operation S1310, frequency characteristics of color channels and an NIR channel of an MSFA pattern image are analyzed (as shown in FIG. 5). Then, in operation S1320, aliasing is reduced by combining the color channels and the NIR channel, such that phase characteristics of the color channels and the NIR channel offset each other (as shown in FIG. 6).

Next, a high resolution base image is generated in operation S1330 by amplifying resolutions of the color channels and the NIR channel, from which the aliasing is removed, up to a resolution of a base image by using a sinc function (as shown in FIG. 7).

A cutoff frequency of the sinc function may be adaptively set according to statistical characteristics of a local region of the MSFA pattern image. The method of adaptively setting the cutoff frequency of the sinc function has been described above, with reference to Equations 6 and 7.

When the high resolution base image is generated, a degree of an artifact is determined in the high resolution base image. Then, the artifact in the high resolution base image is offset in operation S1340 by weighting and combining the high reso-lution base image and a blur image obtained by blurring the high resolution base image, based on a pixel difference value between the high resolution base image and the blur image.

The blur image is weighted more when there are many artifacts, and the high resolution base image is weighted more when there are few artifacts, wherein a sum of the weights is set to be 1. The method of removing the artifact has been described above, with reference to Equations 9 through 12. Therefore, the high resolution base image, from which the artifact is removed, is obtained in operation S1350.

The one or more embodiments may be applied to a digital camera system, e.g., a surveillance camera, which uses a sensor having a structure including RGB pixels and NIR pixels.

According to the exemplary embodiments, a high resolution base image can be obtained by removing aliasing from an MSFA pattern image, and passing the MSFA pattern image through a kernel based on frequency characteristics of sub-sampled color channels and a sub-sampled NIR channel of the MSFA pattern image. Also, by offsetting an artifact using local statistical characteristics of an input image, a high resolution base image, from which an artifact is removed, can be obtained.

The exemplary embodiments can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems, so that the computer-readable code is stored and executed in a distributed fashion. Also, functional programs, codes, and code segments for accomplishing the exemplary embodiments can be easily construed by programmers skilled in the art to which the exemplary embodiments pertain.

The exemplary embodiments can also recite further features of the aliasing offset unit 110 and the artifact offset unit 130 in FIG. 1 of the instant specification. In particular, any of the aliasing offset unit 110 and the artifact offset unit 130 may include at least one processor, a hardware module, or a circuit for performing their respective functions.

While these exemplary embodiments has been particularly shown and described, it will be understood by those of ordinary skill in the art that various changes in form and details may be made therein without departing from the spirit and scope of the exemplary embodiments, as defined by the appended claims. The exemplary embodiments should be considered in a descriptive sense only and not for purposes of limitation. Therefore, the scope of the exemplary embodiments is defined not by the detailed description, but by the appended claims, and all differences within the scope will be construed as being included in the exemplary embodiments.

What is claimed is:

1. A method of processing an image, the method comprising:

offsetting aliasing by analyzing frequency characteristics of at least one color channel and a near-infrared (NIR) channel, of a multi-spectral filter array (MSFA) pattern image;

generating a high resolution base image by amplifying resolutions of the at least one color channel and the NIR channel, from which the aliasing is removed, up to a resolution of a base image using a windowed-sinc function; and offsetting an artifact from the high resolution base image by weighting and combining the high resolution base image and a blur image obtained by blurring the high resolution base image, based on a pixel difference value between the blur image and the high resolution base image, wherein a cutoff frequency $w_c$ of the windowed-sinc function is set based on a tanh function using a local variance of the MSFA pattern image as a variable.

2. The method of claim 1, wherein the offsetting of the aliasing comprises combining the at least one color channel and the NIR channel of the MSFA pattern image, while considering different phase characteristics of the at least one color channel and the NIR channel.

3. The method of claim 1, wherein the cutoff frequency $w_c$ is equal to or greater than $0.5\Pi$.

4. The method of claim 1, wherein the cutoff frequency $w_c$ of the windowed-sinc function is adaptively set according to statistical characteristics of a location region obtained from the MSFA pattern image, and when the local variance is high, the cutoff frequency $w_c$ is set to increase a pass-band of the windowed-sinc function, and when the local variance is low, the cutoff frequency $w_c$ is set to decrease the pass-band of the windowed-sinc function.

5. The method of claim 1, wherein Base(i,j)=(Gs(i,j)+Ns(i,j)+Rs(i,j)+Bs(i,j))*Sinc(i,j), wherein Rs(i,j), Gs(i,j), and Bs(i,j) denote the at least one color channel of the MSFA pattern image, Ns(i,j) denotes the NIR channel of the MSFA pattern image, the aliasing is removed via a sum of the at least one color channel and the NIR channel, and the resolutions of the at least one color channel and the NIR channel are amplified up to the resolution of the base image via the windowed-sinc function.

6. The method of claim 1, wherein the cutoff frequency $w_c$ of the windowed-sinc function is adaptively set according to:

$$\omega_c^{adap} = \frac{\omega_c^{high} - \omega_c^{low}}{\max(\sigma_{local}^2) - \min(\sigma_{local}^2)} \times (x) + \omega_c^{low},$$

wherein x is set according to:

$$x = \frac{\max(\sigma_{local}^2)}{2} \times \tanh\left(\frac{p}{\max(\sigma_{local}^2)}\sigma_{local}^2 - k\right),$$

wherein x is an input for obtaining the cutoff frequency $w_c$, and denotes a variance of the local region adjusted according to an s-curve (tan h) weight, and p and k are factors for adjusting the local region variance.

7. The method of claim 1, wherein the offsetting of the artifact comprises offsetting the artifact by weighting and combining the blur image and the high resolution base image, wherein, when many artifacts are observed, weighting the blur image more, when few artifacts are observed, weighting the high resolution base image more, and a sum of weights of the blur image and the high resolution base image is 1.

8. A method of processing an image, the method comprising:

offsetting aliasing by analyzing frequency characteristics of at least one color channel and a near-infrared (NIR) channel, of a multi-spectral filter array (MSFA) pattern image, and combining the at least one color channel and the NIR channel such that phase characteristics of the at least one color channel and the NIR channel offset each other;

generating a high resolution base image by amplifying resolutions of the at least one color channel and the NIR channel, from which the aliasing is removed, up to a resolution of a base image using a windowed-sinc function, wherein a cutoff frequency $w_c$ of the windowed-sinc function is adaptively set according to statistical characteristics of a local region obtained from the MSFA pattern image and is set based on a tan h function using a local variance of the MSFA pattern image as a variable; and offsetting an artifact of the high resolution base image by weighting and combining the high resolution base image and a blur image obtained by blurring the high resolution base image, based on a pixel difference value between the blur image and the high resolution base image.

9. The method of claim 8, wherein Base(i,j)=(Gs(i,j)+Ns(i,j)+Rs(i,j)+Bs(i,j))*Sinc(i,j), wherein Rs(i,j), Gs(i,j), and Bs(i,j) denote the at least one color channel of the MSFA pattern image, Ns(i,j) denotes the NIR channel of the MSFA pattern image, the aliasing is removed via a sum of the at least one color channel and the NIR channel, and the resolutions of the at least one color channel and the NIR channel are amplified up to the resolution of the base image via the windowed-sinc function.

10. The method of claim 8, wherein the cutoff frequency $w_c$ of the windowed-sinc function is adaptively set according to statistical characteristics of a location region obtained from the MSFA pattern image, and when the local variance is high, the cutoff frequency $w_c$ is set to increase a pass-band of the windowed-sinc function, and when the local variance is low, the cutoff frequency $w_c$ is set to decrease the pass-band of the windowed-sinc function.

11. The method of claim 8, wherein the cutoff frequency we of the windowed-sinc function is adaptively set according to:

$$\omega_c^{adap} = \frac{\omega_c^{high} - \omega_c^{low}}{\max(\sigma_{local}^2) - \min(\sigma_{local}^2)} \times (x) + \omega_c^{low},$$

wherein x is set according to:

$$x = \frac{\max(\sigma_{local}^2)}{2} \times \tanh\left(\frac{p}{\max(\sigma_{local}^2)}\sigma_{local}^2 - k\right),$$

wherein x is an input for obtaining the cutoff frequency $w_c$ and denotes a variance of the local region adjusted according to an s-curve (tan h) weight, and p and k are factors for adjusting the local region variance.

12. The method of claim 8, wherein the offsetting of the artifact comprises offsetting the artifact by weighting and combining the blur image and the high resolution base image, wherein, when many artifacts are observed, weighting the blur image more, when few artifacts are observed, weighting the high resolution base image more, and a sum of weights of the blur image and the high resolution base image is 1.

13. An apparatus for processing an image, the apparatus comprising:

an aliasing offset unit configured to offset aliasing by analyzing frequency characteristics of at least one color channel and a near-infrared (NIR) channel, of a multi-spectral filter array (MSFA) pattern image;

a high resolution base image generator configured to generate a high resolution base image by amplifying resolutions of the at least one color channel and the NIR channel from which the aliasing is removed, up to a resolution of a base image using a windowed-sinc function; and an artifact offset unit configured to offset an artifact from the high resolution base image by weighting and combining the high resolution base image and a blur image obtained by blurring the high resolution base image, based on a pixel difference value between the blur image and the high resolution base image, wherein a cutoff frequency $w_c$ of the windowed-sinc function is set based on a tan h function using a local variance of the MSFA pattern image as a variable, wherein the apparatus comprises at least one processor configured to implement the aliasing offset unit and the artifact offset unit.

14. The apparatus of claim 13, wherein the aliasing offset unit combines the at least one color channel and the NIR channel of the MSFA pattern image, while considering different phase characteristics of the at least one color channel and the NIR channel.

15. The apparatus of claim 13, wherein the cutoff frequency $w_c$ of the windowed-sinc function is adaptively set according to statistical characteristics of a location region obtained from the MSFA pattern image, and when the local variance is high, the cutoff frequency $w_c$ is set to increase a pass-band of the windowed-sinc function, and when the local variance is low, the cutoff frequency $w_c$ is set to decrease the pass-band of the wind owed-sinc function.

16. The apparatus of claim 13, wherein the artifact offset unit offsets the artifact by weighting and combining the blur image and the high resolution base image, wherein, when many artifacts are observed, weighting the blur image more, when few artifacts are observed, weighting the high resolution base image more, and a sum of weights of the blur image and the high resolution base image is 1.

17. An apparatus for processing an image, the apparatus comprising:

an aliasing offset unit configured to offset aliasing by analyzing frequency characteristics of at least one color channel and a near-infrared (NIR) channel, of a multi-spectral filter array (MSFA) pattern image, and combining the at least one color channel and the NIR channel such that phase characteristics of the at least one color channel and the NIR channel offset each other;

a high resolution base image generator configured to generate a high resolution base image by amplifying resolutions of the at least one color channel and the NIR channel, from which the aliasing is removed, up to a resolution of a base image using a windowed-sinc function, wherein a cutoff frequency $w_c$ of the windowed-sinc function is adaptively set according to statistical characteristics of a local region obtained from the MSFA pattern image and is set based on a tan h function using a local variance of the MSFA pattern image as a variable; and an artifact offset unit configured to offset an artifact of the high resolution base image by weighting and combining the high resolution base image and a blur image obtained by blurring the high resolution base image, based on a pixel difference value between the blur image and the high resolution base image.

* * * * *